A. SNIVELY.
Horse Collar.
No. 123,948.
Patented Feb. 20, 1872.
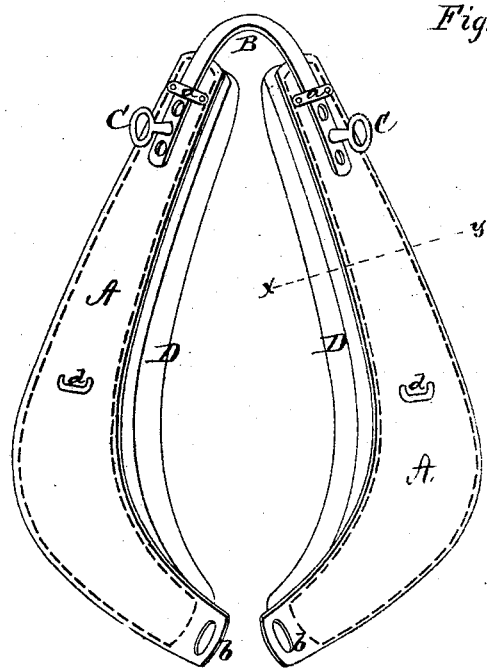
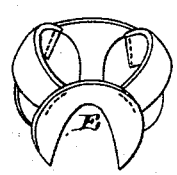
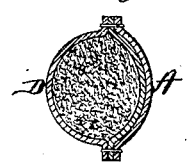
Witnesses:
Henry N. Miller
C. L. Evert
Inventor
Andrew Snively
per Mason
Attorneys:

UNITED STATES PATENT OFFICE.

ANDREW SNIVELY, OF TERRE HAUTE, INDIANA.

IMPROVEMENT IN HORSE-COLLARS.

Specification forming part of Letters Patent No. 123,948, dated February 20, 1872.

*To all whom it may concern:*

Be it known that I, ANDREW SNIVELY, of Terre Haute, in the county of Vigo and in the State of Indiana, have invented certain new and useful Improvements in Combined Collar and Hames; and do hereby declare that the following is a full, clear, and exact description thereof, reference being had to the accompanying drawing and to the letters of reference marked thereon making a part of this specification.

The nature of my invention consists in the construction and arrangement of a combined collar and hames, or padded hames, as will be hereinafter more fully set forth.

In order to enable others skilled in the art to which my invention appertains to make and use the same, I will now proceed to describe its construction and operation, referring to the annexed drawing, in which—

Figure 1 is a front view of the collar and hames. Fig. 2 is a perspective view of the collar-pad; and Fig. 3 is a section through line *x y*, Fig. 1.

A A represent metal plates, formed in shape to suit the neck of the animal for which it is intended. Each plate has a loop or keep, *a*, near the upper end, and a loop or ring, *b*, at the lower end; and also a screw-hole below the loop or keep *a*, and holes for stitches or rivets along the edges. B represents a plate of steel, brass, or other elastic material, formed to fit over the upper ends of the plates A A, passing through the loops *a a*, and having holes in its ends, as shown in Fig. 1. Through either one of these holes, at each end, is passed a screw, C, into the screw-hole on the plate to fasten them together, said screws having rings formed at their outer ends, through which the lines are to be passed. D represents a pad so formed as to fit the inside of the plates A and cause it to rest with ease against the neck and shoulder for which it is intended. E represents the ordinary collar-pad, fastened to the upper end of the collar in the usual manner to protect the top of the neck. The combined collar and hames is intended to open at the bottom and be taken from the animal in the same manner as the ordinary hames with the remainder of the harness, there being sufficient strength and elasticity in the spring-plate B at the top to hold it to its place firmly when strapped below, and when open below to allow it to be taken off with ease. The plates A A are also provided with staples or hooks *d d*, as shown.

Having thus fully described my invention, what I claim as new, and desire to secure by Letters Patent, is—

The combination of the plates A A, perforated spring-plate B, screw-rings C C, pad D, and collar-pad E, all constructed and arranged as described to form a combined collar and hames, substantially as herein set forth.

In testimony that I claim the foregoing I have hereunto set my hand this 10th day of November, 1871.

ANDREW SNIVELY.

Witnesses:
 C. L. EVERT,
 PATRICK CLANCY.